US008072704B1

(12) United States Patent
Goldberg et al.

(10) Patent No.: US 8,072,704 B1
(45) Date of Patent: Dec. 6, 2011

(54) ENERGY-SAVING OPERATION OF A STORAGE DEVICE

(75) Inventors: George Goldberg, Bat-Yam (IL); Doron Chen, Kfar-Saba (IL); Roger Kahn, Jerusalem (IL); Ronen Itshak Kat, Kfar-Saba (IL); Kalman Zvi Meth, Netanya (IL); Julian Satran, Atlit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/783,578

(22) Filed: May 20, 2010

(51) Int. Cl.
*G11B 5/596* (2006.01)
*G11B 21/02* (2006.01)

(52) U.S. Cl. .................... 360/78.06; 360/78.04; 360/75; 711/111; 713/320

(58) Field of Classification Search ........................ None
See application file for complete search history.

(56) References Cited

U.S. PATENT DOCUMENTS 5,412,519 A 5/1995 Buettner et al.
5,801,894 A 9/1998 Boutaghou et al.
6,148,240 A 11/2000 Wang et al.
6,256,163 B1 7/2001 Schmidt et al.
6,512,652 B1 1/2003 Nelson et al.
6,717,763 B2 4/2004 Ottesen et al.
6,809,896 B2 10/2004 Espeseth et al.
6,922,299 B2 7/2005 Sakamoto
6,961,201 B2 11/2005 Odai et al.
7,079,341 B2 7/2006 Kistler et al.
7,143,203 B1 11/2006 Altmejd
7,352,527 B1 4/2008 Ehrlich et al.
7,408,733 B2 8/2008 Satoh et al.
7,471,486 B1 * 12/2008 Coker et al. ............... 360/78.06
7,538,970 B2 * 5/2009 Aoki et al. ................. 360/78.04
7,606,970 B2 10/2009 Lee
7,653,826 B1 1/2010 Day et al.
2002/0171966 A1 11/2002 Ottesen et al.

(Continued)

FOREIGN PATENT DOCUMENTS

JP 2004063038 2/2004

OTHER PUBLICATIONS

Sriram Sankary et al., "Sensitivity Based Power Management of Enterprise Storage Systems", 2009 (IEEE).

(Continued)

*Primary Examiner* — Andrew L Sniezek
(74) *Attorney, Agent, or Firm* — Jason Far-Hadian

(57) ABSTRACT

A computer implemented method is disclosed, for energy-saving operation of a storage device with a read/write head. The method includes monitoring workload of the storage device, calculating current mean workload and adjusting seek speed of the read/write head of the storage device to one of a plurality seek speeds depending on the calculated current mean workload. The step of adjusting the seek speed of the read/write head includes adjusting the seek speed of the read/write head to be a first seek speed if the calculated current mean workload is below a first threshold, adjusting the seek speed of the read/write head to be a second seek speed if the calculated current mean workload is between the first threshold and a second threshold, and adjusting the seek speed of the read/write head to be the first seek speed if the calculated current mean workload is greater than the second threshold. A computer program product and a data processing system are also disclosed.

18 Claims, 4 Drawing Sheets

Monitor current number of concurrent I/O requests 30
Calculated current mean concurrent I/O requests (CMCR) 31
Is CMCR below first threshold? 32
No
Yes
Is CMCR below second threshold? 33
No
Yes
Adjust seek speed of the read/write head of the disk drive to be a first seek speed 34
Adjust seek speed of the read/write head of the disk drive to be a second seek speed lower than first seek speed 36

U.S. PATENT DOCUMENTS

2005/0125600 A1 6/2005 Ehrlich
2005/0174678 A1 8/2005 Zayas et al.

OTHER PUBLICATIONS

Sudhanva Gurumurthi et al, "DRPM: Dynamic Speed Control for Power Management in Server Class Disks", 2003.
Xiaodong Li et al, "Performance Directed Energy Management for Main Memory and Disks", 2004.
Le Cal et al, "Power Reduction of Multiple Disks Using Dynamic Cache Resizing and Speed Control", 2006.
Anupam, "GreenPower: Earth-friendly HDDs from Western Digital", Jul. 25, 2007.

* cited by examiner

| Number of concurrent read requests | Energy Consumption at Normal Mode | Energy Consumption at Quiet Mode | Energy Difference (percentage) |
|---|---|---|---|
| 1 | 6063 J | 6419 J | +5.9% |
| 2 | 6001 J | 6390 J | +6.5% |
| 4 | 5234 J | 5122 J | -2.2% |

Fig. 1A

| SPC-1 like I/O rate | Energy Consumption at Normal Mode | Energy Consumption at Quiet Mode | Energy Difference (percentage) |
|---|---|---|---|
| 10 | 8486 J | 8298 J | -2.2% |
| 25 | 9608 J | 9012 J | -6.2% |
| 50 | 11300 J | 9887 J | -12.5% |

Fig. 1B

ENERGY-SAVING OPERATION OF A STORAGE DEVICE

BACKGROUND

The present invention relates to energy saving. More specifically, the present invention relates to an energy-saving operation of a storage device which has a movable read/write head.

There is little doubt today as to the need for energy saving. Electrical energy conservation is an important element of energy policy, reducing energy consumption and demand, in the attempt to balance the increasing energy demand of the world's growing population with the decline of energy resources and soaring energy costs. Reducing power consumption in computer systems has undoubtedly become an important issue.

A hard disk drive device typically includes one or more flat disks called platters (42, see FIG. 4), which are coated with a layer of magnetic material, onto which data is recorded or read by a head (hereinafter—read/write head, 46, see FIG. 4) held by an actuator arm (48, FIG. 4) and actuated by an actuator (43, FIG. 4) to move across the platter (indicated by arrows in FIG. 4). The platter is coupled to and rotated by a spindle (44, FIG. 4). By incorporating rotation of the platter with motion of the head over the platter it is possible to bring the head over a desired data block and write onto it or read it.

Hard disks are typically provided with an acoustic management capability, which facilitates control over the level of noise generated by the hard disk drive. In hard disk drives with acoustic management the seek speed of the read/write head (i.e. the speed at which it is moved to reach its target position) is controlled. In many such hard disk drives several seek speeds are available (also refereed to as "acoustic modes").

Attempts were made to reduce the acoustic noise of disk storage. For example, it was proposed in the past to actively control the seek speed so that the head arrives at its destination only just in time to read the desired data block, rather than arriving as quickly as possible and then having to wait for the data block to come around (phenomenon known as the "rotational latency").

Another way of reducing energy consumption was to reduce the spin speed of storage disks to reduce energy consumption and generate less waste heat.

SUMMARY

According to embodiments of the present invention there is provided a computer implemented method for energy-saving operation of a storage device with a read/write head. The method includes monitoring workload of the storage device, calculating a current mean workload of the storage device and adjusting seek speed of the read/write head to one of a plurality of seek speeds depending on the calculated current mean workload. The step of adjusting the seek speed of the read/write head includes adjusting the seek speed of the read/write head to be a first seek speed if the calculated current mean workload is below a first threshold, adjusting the seek speed of the read/write head to be a second seek speed if the calculated current mean workload is between the first threshold and a second threshold, and adjusting the seek speed of the read/write head to be the first seek speed if the calculated current mean workload is greater than the second threshold.

Furthermore, in accordance with embodiments of the present invention, there is provided a computer program product stored on a non-transitory tangible computer readable storage medium for energy-saving operation of a storage device with a read/write head. The computer program includes code for monitoring workload of the storage device, calculating a current mean workload and for adjusting seek speed of the read/write head to one of a plurality seek speeds depending on the calculated current mean workload. The computer program code for adjusting the seek speed further includes adjusting the seek speed of the read/write head to be a first seek speed if the calculated current mean workload is below a first threshold, adjusting the seek speed of the read/write head to be a second seek speed if the calculated current mean workload is between the first threshold and a second threshold, and adjusting the seek speed of the read/write head to be the first seek speed if the calculated current mean workload is greater than the second threshold.

Furthermore, in accordance with embodiments of the present invention, there is provided an energy saving data processing system. The system includes a processor; a storage device with a read/write head; a computer usable medium connected to the processor for storing a computer program that includes a set of instructions to be executed by the processor. The set of instructions includes monitoring workload of the storage device, calculating a current mean workload and adjusting seek speed of the read/write head to one of a plurality seek speeds depending on the calculated current mean workload. The instructions for adjusting the seek speed of the read/write head includes adjusting the seek speed of the read/write head to be a first seek speed if the calculated current mean workload is below a first threshold, adjusting the seek speed of the read/write head to be a second seek speed if the calculated current mean workload is between the first threshold and a second threshold, and adjusting the seek speed of the read/write head to be the first seek speed if the calculated current mean workload is greater than the second threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A is a table presenting a comparison between energy consumption of a given hard disk drive (1TB 3.5" Hitachi) at different (read) workloads.

FIG. 1B is a table presenting comparison of energy consumption of a SPC-1 like (Storage Performance Council standard) workload at various I/O (Input-Output) rates.

DETAILED DESCRIPTION

Figure 2:
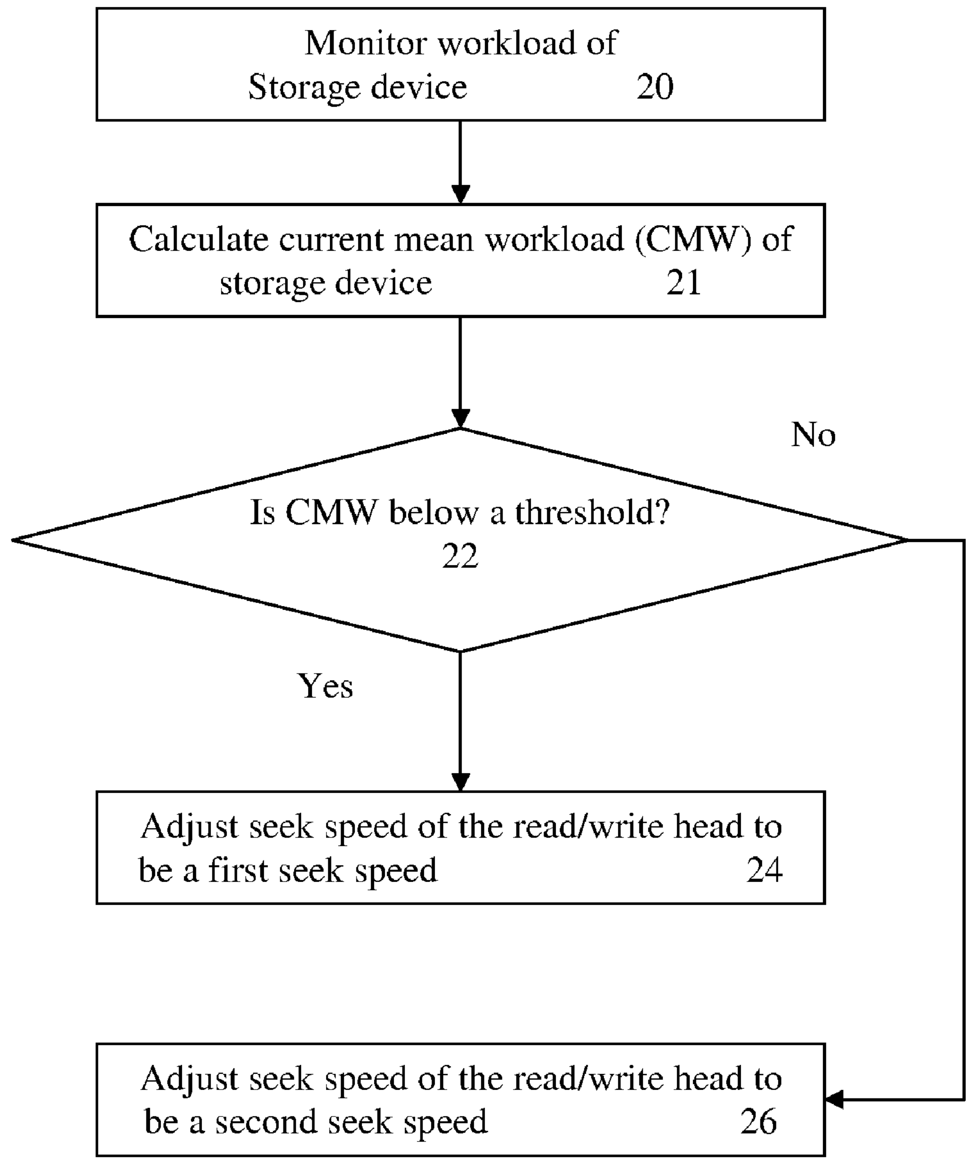
FIG. 2 is a flow chart of a method for energy-saving operation of a storage device with a read/write head, according to embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to embodiments of the present invention it is proposed to control the operation of a read/write head of a storage device, such as, for example, a hard disk drive, in an energy-saving manner, i.e. to minimize the energy consumption for a given disk-access scenario. To achieve this it is proposed to employ different seek speeds of the read/write head in a manner which is hereinafter described.

The present invention is applicable for single-disk storage devices as well as for multiple-disk storage devices.

According to embodiments of the present invention the overall disk seek energy consumption is controlled based on the monitoring disk workload and utilization, and calculating a current mean workload. Acoustic mode change is effective for energy savings, for example, if one of the following situations holds:

1. An appropriate workload is identified with reference to workload characteristics, such as, for example, operation type (read/write), transfer size and access type (random/sequential). The disk acoustic mode may be changed during a predefined current mean workload, which may be determined by monitoring one or more workload characteristics and calculating the current mean workload, per a given time interval. Predetermined specific threshold values may vary, depending on the type of the storage device.

2. An appropriate disk utilization scenario is identified based on idle time and the length of the disk queue. If there is enough idle time then the disk seek time may be increased (at the expense of disk idle time). If the concurrency level of I/O operations is high enough, then a lower seek speed may be chosen.

Energy saving, according to embodiments of the present invention, may be achieved by applying the appropriate seek speed according to the calculated current mean workload.

Changing the acoustic modes of a disk drive changes power consumption of the disk drive. Since the feature was originally implemented to reduce noise and friction, the higher power mode is usually called "normal mode" (or "performance mode") and the lower power mode is usually called "quiet mode". A hard disk drive may have more than two acoustic modes. For example, in the SATA specification, 128 seek modes are defined.

This feature allows the disk user system, whether having a single disk storage system, Redundant Array of Independent Disks (RAID) or any other configuration, to adjust the seek speed of the disk head. Reducing the seek speed of the disk head also decreases the power dissipation of the disk drive. According to embodiments of the present invention, this feature can be exploited to reduce disk energy consumption.

It is evident, when considering the power consumption of a hard disk drive, that for some workloads the energy consumption (defined as power consumption over time) actually increases when using quiet acoustic mode for the same workload. However, in some cases, energy reduction is present. Therefore, using quiet mode for every workload in order to save energy is not advised.

FIG. 1A is a table presenting a comparison between energy consumption of a given hard disk drive at different (read) workloads. The information in this table is based on tests carried out by the inventors of the present invention on a specific hard disk drive—1TB 3.5" Hitachi.

It is evident from that table that for a small number (1, 2) of concurrent read requests changing the acoustic mode of the disk drive from normal mode to quiet mode would result in an increase in energy consumption. However at a certain threshold number of concurrent requests changing the acoustic mode of the disk drive from normal mode to quiet mode would result in a decrease in energy consumption (4 requests).

However, over a second, higher threshold number of concurrent read requests, changing the acoustic mode of the disk drive from normal mode to quiet mode may again result in an increase of energy consumption and degraded performance.

FIG. 1B is a table presenting comparison of energy consumption of a SPC-1 like (Storage Performance Council standard) workload at various I/O (Input-Output) rates.

One may conclude that for a given type of storage device there is a first current mean workload threshold below which it would be recommended to operate a storage device at normal mode (i.e. operating the read/write head at a first seek speed) and over which it would be recommended to operate the storage device at quiet mode (i.e. operating the read/write head at a second seek speed, which is slower than the first seek speed) to achieve energy saving. Furthermore, there is a second current mean workload threshold over which it would be recommended to operate the storage device at normal mode again, to save energy and maintain a sustainable performance level.

When operating the storage device in accordance with embodiments of the present invention no data needs to be moved, no caching is required, nor is any other data manipulation needed. An algorithm may be used to operate a storage device according to embodiments of the present invention.

Operating a storage device according to embodiments of the present invention would reduce the overall energy consumed by the device. Operating a storage device according to embodiments of the present invention may be used in conjunction with other energy-saving methods in order to reduce power dissipation further than would be achieved by any one of these methods alone.

According to embodiments of the present invention it is suggested to characterize workload of the storage device, and monitor the workload and disk utilization (the term workload, for the context of the present invention is understood to include both disk workload and disk utilization), in order to optimize energy consumption of the hard disk drive. Current mean workload is calculated form the monitored workload information, and consequently the seek speed of the read/write head is adjusted based on the calculated current mean workload (e.g. by setting different acoustic modes of the disk) in a predetermined manner, as is described hereinafter.

Workload may be determined by considering one or more of the following parameters: operation type (read/write), transfer size, access type (random/sequential), and disk utilization. Disk utilization may be determined by considering one or more of the following parameters: idle time, disk queue, and response time.

The "current mean workload" is calculated by considering a predetermined time interval, and calculating the mean value of the specific workload characteristic that is monitored over a current time interval. The length of the time interval may be selected arbitrarily.

Workload characteristics for consideration, according to embodiments of the present invention, may include, for example, disk utilization, idle time between consecutive read/write (or I/O) requests, number of concurrent I/O requests, condition of the I/O request cache (how full it is) and seek distance traveled by the read/write head between consecutive read/write requests.

FIG. 2 is a flow chart of a method for energy-saving operation of a storage device with a read/write head, according to embodiments of the present invention.

The method includes monitoring workload of the storage device (20) and calculating a current mean workload (CMW) of the storage device (21). It is then determined whether the CMW is below a predetermined threshold (22) and the seek speed of the read/write head of the storage device is adjusted to one of a plurality seek speeds depending on the monitored current workload (24, 26). The calculated CMW is compared to a threshold (22). If the CMW is below that threshold then the seek speed of the read/write head is set to be a first seek speed (24). If the CMW is not below that threshold (that is—equal or greater than the threshold) then the seek speed of the read/write head is set to be a second seek speed (26).

A method for energy-saving operation of a storage device with a read/write head, according to embodiments of the present invention, may be performed in a feedback loop manner.

A control algorithm for energy-saving operation of a storage device, according to embodiments of the present invention, may include the following steps:

For a given time interval:

a) If one or more of the following current conditions is met adjust seek speed of the read/write head of the hard disk drive to a first low value:

i. Current mean disk utilization is below a predetermined threshold $T_1$;

ii. Current mean idle time between consecutive I/O requests is greater than threshold $T_2$;

iii. Current mean number of concurrent I/O requests is greater than threshold $T_3$;

b) If one or more of the following current conditions is met adjust seek speed of the read/write head of the storage device to a second value (higher than the first value):

i. Current mean disk utilization is greater than threshold $T'_1$;

ii. Current mean idle time between consecutive I/O requests is smaller than threshold $T'_2$;

iii. Current mean number of concurrent requests in the queue (disk, controller, or operating system queue) is less than $T'_3$;

iv. Currently I/O request queue is full.

$T_1$ and $T_1'$, (as well as $T_2$ and $T_2'$, $T_3$ and $T_3'$, respectively) are related as referring to the same "threshold", yet they are defined as having different (perhaps just slightly different) values so as to avoid erratic fluctuations in seek speed of the read/write head of the storage device.

According to other embodiments of the present invention the read/write head of the storage device may be adjusted to operate in a low seek speed value (quiet mode) when the current workload matches one or more of the following current conditions:

i. Current mean idle time between consecutive requests is between a first threshold idle time $T_{idle1}$ and a second threshold idle time $T_{idle2}$;

ii. Current number of I/O requests in the queue (disk, controller, or operating system queue) is between threshold $Q_{min}$ and threshold $Q_{max}$, iii. Current mean seek distance traveled by the read/write head between consecutive read/write requests is smaller than a seek distance $Seek_{min}$, where $Seek_{min}$ depends on the type of disk. Example $Seek_{min}$ can be 100 cylinders.

Note that actual values of the workload characteristics thresholds may vary, depending on the specific hard disk drive type (and its working parameters, such as, for example, typical seek speeds, rotational velocity of the disk platters). Determining the threshold may require some testing or knowledge of specific disk characteristics as provided by the hard disk drive manufacturer.

In order to appreciate orders and scales of the abovementioned thresholds values consider for example, $T_{idle1}$=5 ms, $T_{idle2}$=500 ms, $Q_{depth-min}$=4, $Q_{depth-max}$=16. These values are not necessarily the threshold values that would be used for any given type of hard disk drive, as actual threshold values depend on the specific type of hard disk drive.

Figure 3:
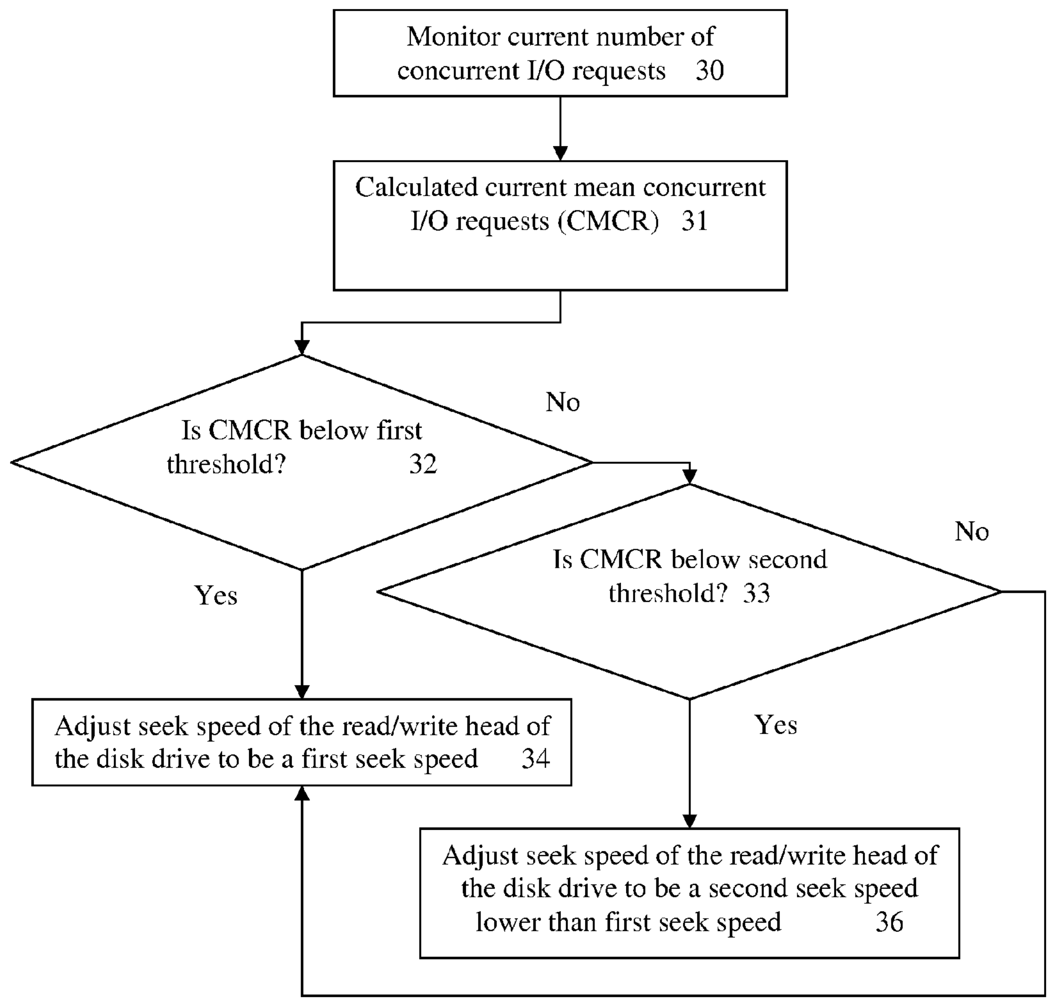
FIG. 3 is a flow chart of a method for energy-saving operation of a storage device with a read/write head, which includes monitoring current mean number of read/write requests in the queue, according to embodiments of the present invention.

FIG. 3 is a flow chart of a method for energy-saving operation of a storage device with a read/write head, which includes monitoring current number of read/write requests in the queue, according to embodiments of the present invention.

The method includes monitoring current number of concurrent I/O requests in the queue (disk, controller, or operating system queue) (30) and calculating a current mean number of concurrent I/O requests (CMCR) (31). The CMCR is compared with a first threshold (32). If CMCR is below the first threshold then the seek speed of the read/write head is set to be a first seek speed (34). If CMCR is not below the first threshold it is compared with a second—higher—threshold (33). If CMCR is below the second threshold then the seek speed of the read/write head is set to be a second seek speed (36). If CMCR is not below the first and the second thresholds (i.e. equal or greater than the second threshold) then the seek speed of the read/write head is set to be the first seek speed (34). In this example, the first seek speed is higher than the second seek speed. It should be clear to those skilled in the art that it is possible to utilize multiple (more than 2) seek speeds to achieve energy savings, if more such seek speeds (acoustic modes) are available.

For practical purposes, in order to prevent fluctuations on the operation of the disk, it may be advantageous to choose a specific value for the current workload threshold which when exceeded will cause the seek speed of the read/write head to be changed from a first speed to a second speed, but assign a slightly different value to the same threshold so that when the current workload drops below that threshold the seek speed of the read/write head will be changed back to its first speed.

Figure 4:
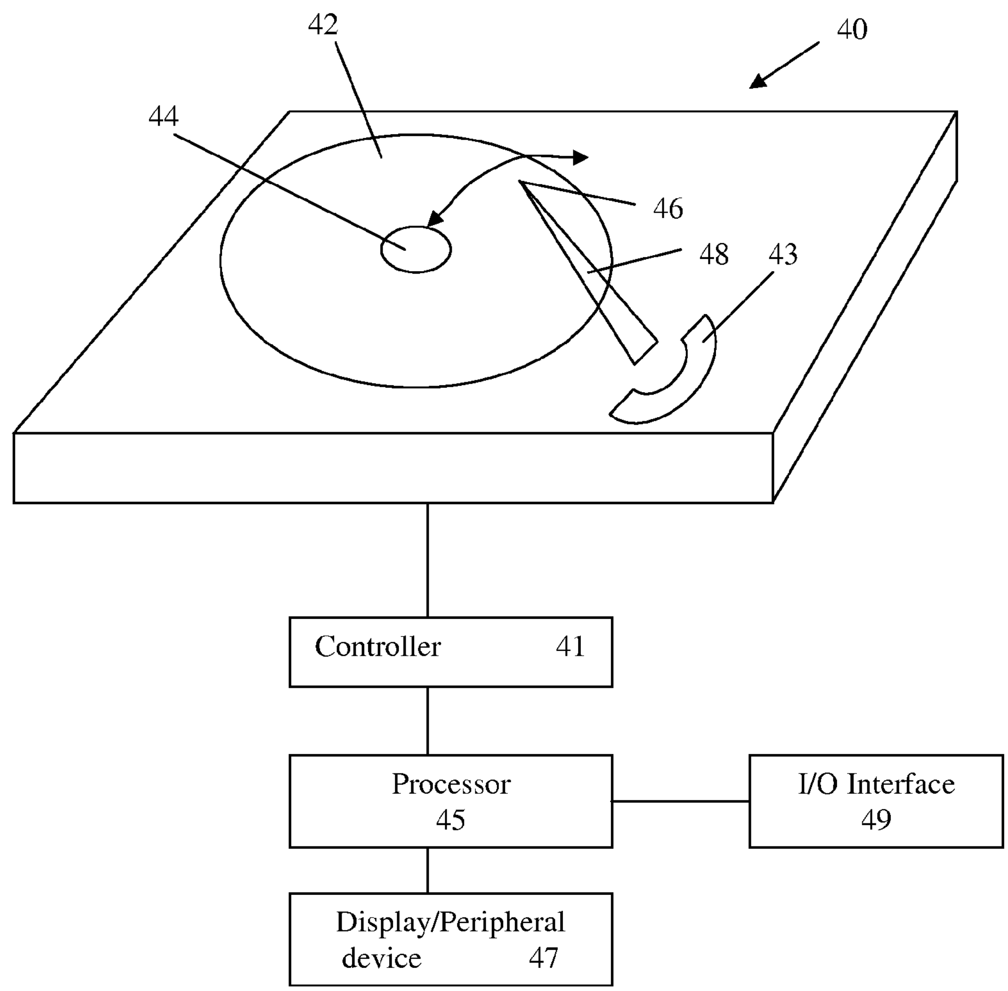
FIG. 4 illustrates a hard disk drive incorporated in a computer system, according to embodiments of the present invention.

FIG. 4 illustrates a hard disk drive (40) incorporated in a data processing system, according to embodiments of the present invention.

The data processing system includes a hard disk drive (40) which includes one or more platters (42) onto which data may be recorded or read by a read/write head (46) held by an actuator arm (48) actuated by an actuator (43) which moves the head across the platter to be placed over a desired data block. The platter is coupled to and rotated by a spindle (44). A controller (41) controls the operation of the hard disk drive, and is connected to a processor (45). Also may be included an I/O interface device (49) and display or other peripheral device (47).

The controller (41) may set the seek speed of the read/write head (46) of the hard disk drive (40) as dictated by an algorithm for energy-saving operation of a hard disk drive, according to embodiments of the present invention.

What is claimed is:

1. A computer implemented method for energy savings for operation of a storage device with a read/write head, the method comprising:

monitoring workload of the storage device;

calculating current mean workload; and adjusting seek speed of the read/write head of the storage device to one of a plurality seek speeds depending on the calculated current mean workload, wherein adjusting the seek speed of the read/write head includes:

adjusting the seek speed of the read/write head to be a first seek speed if the calculated current mean workload is below a first threshold;

adjusting the seek speed of the read/write head to be a second seek speed if the calculated current mean workload is between the first threshold and a second threshold; and adjusting the seek speed of the read/write head to be the first seek speed if the calculated current mean workload is greater than the second threshold.

2. A computer implemented method as claimed in claim 1, wherein adjusting the seek speed of the read/write head of the storage device includes: adjusting the seek speed of the read/write head to be a first seek speed if the calculated current mean workload is below a first threshold, and setting the seek speed of the read/write head to be a second seek speed if the calculated current mean workload is above the first threshold.

3. A computer implemented method as claimed in claim 1, wherein monitoring the workload includes monitoring a characteristic of the workload, which is selected from the group of workload characteristics consisting of: disk utilization, idle time between consecutive I/O requests, number of concurrent I/O requests, condition of an I/O request cache and seek distance traveled by the read/write head between consecutive I/O requests.

4. A computer implemented method as claimed in claim 1, wherein the first seek speed is faster than the second seek speed.

5. A computer implemented method as claimed in claim 1, wherein the storage device is a hard disk drive.

6. A computer implemented method as claimed in claim 5, wherein adjusting the seek speed of the read/write head comprises adjusting an acoustic mode of the hard disk drive.

7. A computer program product stored on a non-transitory tangible computer readable storage medium for energy-saving operation of a storage device with a read/write head, the computer program including code for monitoring workload of the storage device;

calculating current mean workload; and adjusting seek speed of the read/write head of the storage device to one of a plurality seek speeds depending on the caluculated current mean workload, wherein the computer program code for adjusting the seek speed further including:

adjusting the seek speed of the read/write head to be a first seek speed if the calculated current mean workload is below a first threshold;

adjusting the seek speed of the read/write head to be a second seek speed if the calculated current mean workload is between the first threshold and a second threshold; and adjusting the seek speed of the read/write head to be the first seek speed if the calculated current mean workload is greater than the second threshold.

8. A computer program product as claimed in claim 7, wherein the computer program includes code for adjusting the seek speed of the read/write head to be a first seek speed if the calculated current mean workload is below a first threshold, and for adjusting the seek speed of the read/write head to be a second seek speed if the calculated current mean workload is above the first threshold.

9. A computer program product as claimed in claim 7, wherein monitoring the workload includes monitoring a characteristic of the workload, which is selected from the group of workload characteristics consisting of: disk utilization, idle time between consecutive I/O requests, number of concurrent I/O requests, condition of an I/O request cache and seek distance traveled by the read/write head between consecutive I/O requests.

10. A computer program product as claimed in claim 7, wherein the first seek speed is faster than the second seek speed.

11. A computer program product as claimed in claim 7, wherein the storage device is a hard disk drive.

12. A computer program product as claimed in claim 11, wherein adjusting the first seek speed comprises adjusting an acoustic mode of the hard disk drive.

13. An energy savings data processing system comprising:

a processor; a storage device with a read/write head; a computer usable medium connected to the processor for storing a computer program that includes a set of instructions to be executed by the processor, the set of instructions including:

monitoring workload of the storage device;

calculating current mean workload; and adjusting seek speed of the read/write head of the storage device to one of a plurality seek speeds depending on the caluculated current mean workload, wherein adjusting the seek speed of the read/write head includes:

adjusting the seek speed of the read/write head to be a first seek speed if the calculated current mean workload is below a first threshold;

adjusting the seek speed of the read/write head to be a second seek speed if the calculated current mean workload is between the first threshold and a second threshold; and adjusting the seek speed of the read/write head to be the first seek speed if the calculated current mean workload is greater than the second threshold.

14. A data processing system as claimed in claim 13, wherein adjusting the seek speed of the read/write head includes: adjusting the seek speed of the read/write head to be a first seek speed if the calculated current mean workload is below a first threshold, and adjusting the seek speed of the read/write head to be a second seek speed if the calculated current mean workload is above the first threshold.

15. A data processing system as claimed in claim 13, wherein monitoring the workload includes monitoring a characteristic of the workload, which is selected from the group of workload characteristics consisting of: disk utilization, idle time between consecutive I/O requests, number of concurrent I/O requests, condition of an I/O request cache and seek distance traveled by the read/write head between consecutive I/O requests.

16. A data processing system as claimed in claim 13, wherein the first seek speed is faster than the second seek speed.

17. A data processing system as claimed in claim 13, wherein the storage device is a hard disk drive.

18. A data processing system as claimed in claim 17, wherein adjusting the seek speed comprises adjusting an acoustic mode of the hard disk drive.

* * * * *